P. H. WITHINGTON.
HAND AGRICULTURAL TOOL.
APPLICATION FILED NOV. 30, 1908.
919,799.  Patented Apr. 27, 1909.
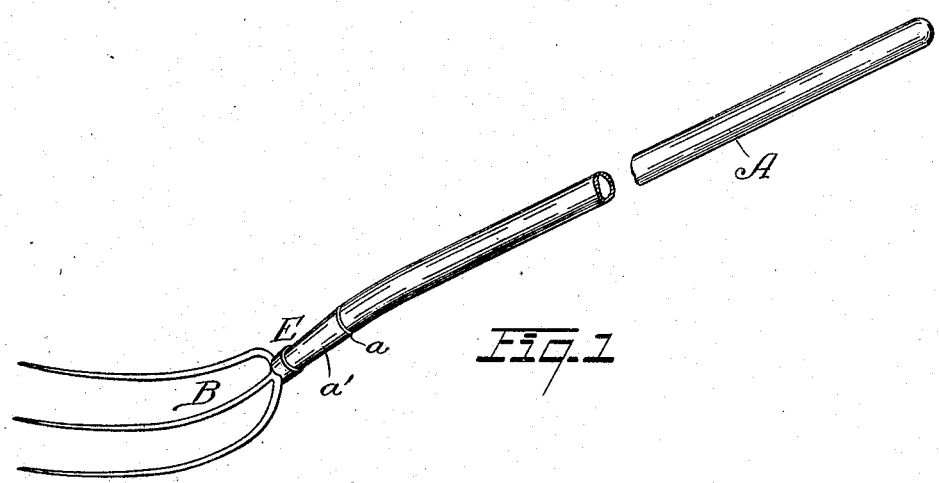
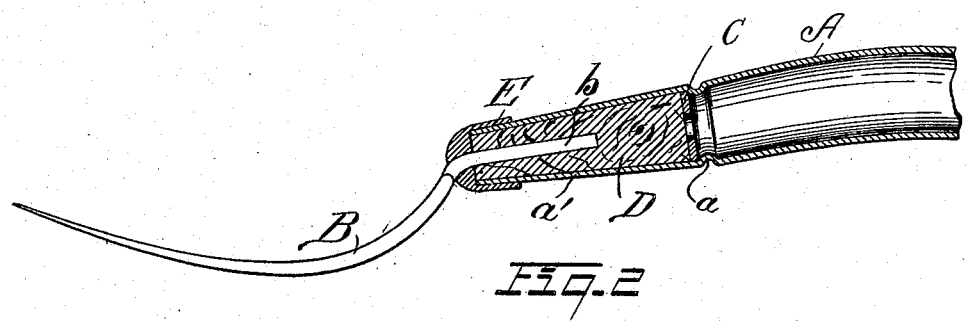
Witnesses:
Nathan F. Fretter.
Brennan B. West.
Inventor.
Philip H. Withington
By Baker Jones Hull,
Attys

UNITED STATES PATENT OFFICE.

PHILIP H. WITHINGTON, OF CLEVELAND, OHIO, ASSIGNOR TO AMERICAN FORK AND HOE COMPANY, OF CLEVELAND, OHIO, A CORPORATION OF NEW JERSEY.

HAND AGRICULTURAL TOOL.

No. 919,799.  Specification of Letters Patent.  Patented April 27, 1909.

Application filed November 30, 1908. Serial No. 465,090.

*To all whom it may concern:*

Be it known that I, PHILIP H. WITHINGTON, a citizen of the United States, residing at Cleveland, in the county of Cuyahoga and State of Ohio, have invented a certain new and useful Improvement in Hand Agricultural Tools, of which the following is a full, clear, and exact description, reference being had to the accompanying drawings.

The object of this invention is to provide a simple, efficient and cheap handle for a hand agricultural tool. My handle is a hollow metal tube and the invention provides means for effectively securing to it the body of the tool, as, for example, a fork, or rake head, or similar implement.

The invention consists of the means I employ in effecting securement of the head to the handle, as illustrated in the drawing and hereinafter more fully explained.

In the drawing, Figure 1 is a perspective view of a fork embodying my invention; Fig. 2 is an enlarged section through a portion of the handle of such tool.

In each of the figures, E represents the handle, which is a metal tube made of suitable material drawn or otherwise formed.

B represents the head of the tool, which is shown as a fork. This fork has a shank $b$ by which it is secured to the handle. To effect the securement I first form in the handle near one end an annular groove $a$ by pressing the metal inwardly. I then place in the handle bearing against this groove a suitable stop consisting of a disk or washer C. I then place in the tube, against the stop C, a suitable plug D, which is preferably of wood. This plug when put in place may be tapered, as shown, toward the adjacent end of the handle and may have a central bore. After the plug is in place the handle is swaged down onto the plug to make a tapered end, as shown at $a'$. A suitable cap E is placed over the shank $b$ of the tool head and then this shank is driven into the plug D, the cap extending over the outside of the tapered end portion $a'$ of the handle.

A tool constructed as above is very neat in appearance and is light and cheap in construction. The inward projection made by the groove $a$, together with the washer C, forms a stop for the wooden plug, so that when the shank $b$ is driven into the plug the plug retains its position and is not forced farther into the handle.

The construction described is very effective. The groove and washer hold the wooden plug against inward movement, and the tapering of the handle prevents its working outwardly. The cap not only gives a neat appearance but keeps the wooden plug dry. By this invention I obtain the maximum durability, for there are no exposed wooden parts to deteriorate. On the other hand, the inclosed wooden plug retains a very firm hold on the shank.

Having thus described my invention, what I claim is:

1. The combination of a tubular handle formed with an inward projection, a suitable stop resting against such projection, a plug within the handle resting against the stop, and a tool head extending into the plug.

2. A hand agricultural tool comprising a tubular handle formed with an inward projection, a stop within the handle resting against such projection, a plug within the handle bearing against the stop, a tool head having a shank occupying the plug, and a cap surrounding the shank and extending onto the outside of the handle.

3. In a hand agricultural tool, the combination of a tubular handle, a groove formed around the same to make an inward projection, a stop within the tube bearing against such inward projection, a plug within the tube bearing against the stop, the tube being tapered toward the free end around the plug, and a tool head having a shank occupying the plug.

4. In a hand agricultural tool, the combination of a handle comprising a metal tube, an annular groove formed therein near the end, such groove making an inward projection, a metal disk within the tube bearing against such projection, a wooden plug within the tube extending substantially from the end thereof to said disk, the tube being tapered toward the free end of the plug, a tool head having a shank occupying substantially the center of the wooden plug, and a metal cap surrounding the shank and extending onto the outside of the tapered portion of the handle.

5. The combination of a metallic tubular handle, an inward projection formed by bending inwardly the metal of the handle, a stop held by such projecton, a plug resting against such stop, and a tool head having a shank occupying such plug.

In testimony whereof, I hereunto affix my signature in the presence of two witnesses.

PHILIP H. WITHINGTON.

Witnesses:
CYRUS REIMER,
BRENNAN B. WEST.